April 25, 1967  E. H. MARPLE  3,315,973
TRAILER CONSTRUCTION
Filed April 9, 1965

INVENTOR.
Ernest H. Marple
BY

United States Patent Office 3,315,973
Patented Apr. 25, 1967

3,315,973
TRAILER CONSTRUCTION
Ernest H. Marple, San Gabriel, Calif.
(1224 W. Garvey, Monterey Park, Calif. 91754)
Filed Apr. 9, 1965, Ser. No. 446,857
13 Claims. (Cl. 280—34)

This invention relates to a trailer constduction and is more particularly concerned with a novel extensible trailer and novel retractible supporting and/or stabilizing means therefor.

In the art of trailers, that is, two-wheeled vehicles adapted to be releasibly connected with and towed by a tractor or towing vehicle, such as an automobile, it is common practice to arrange the center of gravity of the trailer slightly forward of the supporting wheels so that a predetermined portion of the weight of the trailer construction is distributed downwardly onto and through the rear end of the towing vehicle and to provide retractible supporting and/or stabilizing jacks or standards at the front end portion of the trailer, forward of the supporting wheels and adapted to be shifted into engagement with the ground or road on which the trailers are supported and to hold the front ends of the trailers up and in a horizontal position, when the trailers are disconnected from their towing vehicles.

The jacks or standards of the character refrered to that have been provided by the prior art vary widely in form and construction.

In recent years the trailer art has provided a number of unique, extensible, house-trailer constructions. These extensible house-trailer constructions involve generally, an elongate outer, primary, box-like rear section having a roof, side walls, a floor, and a rear end wall and an open front, and a forward, secondary or inner section, shorter than the primary section and slidably engaged in the primary section from the open front end thereof. The secondary section, like the primary section, has a roof, side walls, a floor, and a front end wall. The primary section in which the secondary section is engaged and carried has a suitable under-carriage or frame and carries or is connected with suitable supporting wheels. The secondary section is provided with a forwardly projecting tongue having a suitable hitch thereon to facilitate connecting the trailer with the towing vehicle.

The secondary section is adapted to be shifted rearwardly into the confines of the primary section when the trailer is being trailed, thereby materially shortening and improving the balance and the maneuverability of the trailer when it is being towed. The forward secondary section is adapted to be shifted forwardly relative to the primary section when the trailer is stationary and readied for occupancy, thereby materially increasing the effective and usable interior area or space afforded by the trailer.

In such constructions, suitable tracks and the like are provided to facilitate shifting the sections relative to each other and to maintain them in proper alignment. Suitable lodging means are provided to releasably secure the sections in either of their two positions, that is, their collapsed or extended positions.

In the ordinary extensible trailer, the construction is suitably balanced for trailing with respect to its supporting wheels, when the construction is collapsed and in towing position. When such a trailer construction is shifted to its extended position, it becomes overbalanced forwardly and the forward portion must be blocked. or jacked up in order to maintain it in a horizontal position or plane.

The prior art, has to date failed to provide a simple, easy to operate, and effective means for supporting the forward portion of an extensible trailer of the general character referred to.

The prior art has, for many years, povided trailers with retractible, gound-engaging standards for supporting the trailers in a horizontal poistion when disconnected from their towing vehicles. Such retractible standards ordinarily involve an elongate pipe or column having one end pivotally connected with a clevis plate type mounting bracket affixed to the bottom of the trailer and a ground-engaging pad at its other end. The standard or column is ordinarily held in a horizontal position under the frame by a suitable latch or binding and is released to swing down to a vertical position, where its pad engages the ground, when the trailer is unhitched from its towing vehicle.

The principal difficulty with such standards resides in the fact that the limited available space between the bottom of the trailers and the ground or road, prohibits the provision of a ground-engaging pad of sufficient size or extent to prevent the column from being urged and forced downwardly into the ground by the weight of the trailer. As a result, it is common practice for those who use such trailer constructions to carry planks or boards of considerable size or extent, in the trailers, which boards or planks can be arranged on the ground, beneath the standards, to prevent the standards from sinking into the ground and upsetting the trailer related thereto.

An object of this invention is to provide a novel extensibel trailer construction.

A further object of this invention is to provide a novel retractible standard for an extensible trailer construction.

A further object of my invention is to provide a retractible trailer standard having an elongated axially adjustable sectional column, means pivotally securing one end of the column ot the underside of a trailer whereby the column can be shifted from a horizontal position where it occurs adjacent the underside of the trailer to a vertical poistion where its other or lower end occurs adjacent the ground and a ground-engaging pad at said other end of the column with a leaf-like extension shiftable from a foldable position where it occurs at right angles to the pad to a ground-engaging position where it occurs in a common plane with the pad.

It is a further object of my invention to provide a novel support and latch means for releasably retaining the retractible standard in its retracted position.

The various objects and features of my invention will be fully understood from the following detailed description of a typical preferred form and application of my invention, throughout which description reference is made to the accompanying drawings, in which, FIGURE 1 is a side elevational view of an extensible trailer as provided by the present invention, with my new support means related to it and showing the trailer in a collapsed position and connected with a towing vehicle;

Figure 1:
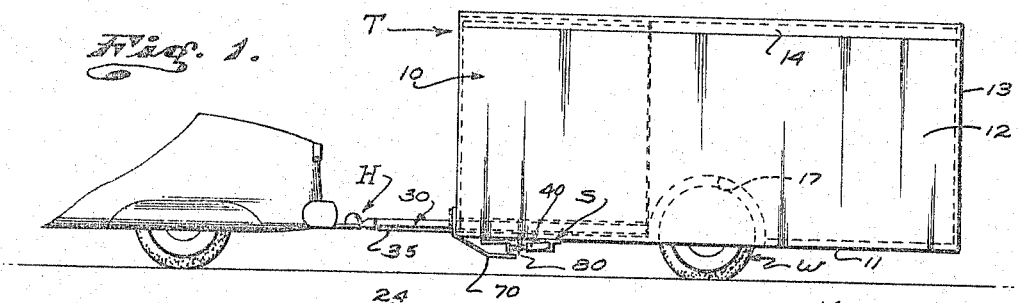

The structure provided by the present invention involves generally, an extensible trailer T and a novel support means S for the trailer.

The trailer T is shown as involving a primary, box-like, outer section 10 having a flat horizontally disposed floor or bottom wall 11, vertically disposed side walls 12, a vertically disposed rear end wall 13 and a crowned or cambered roof or top wall 14.

The outer section 10 of the trailer T is provided with a suitable framework which framework, in addition to other members and/or parts includes stringers 15 extending longitudinally along the upper side edges of the bottom wall or floor 11. The forward portions of the stringers 15 are provided with laterally inwardly projecting longitudinal rails 16. In practice, the rails 16 are formed of steel and are secured to the stringers by means of suitable screw fasteners.

The section 10 is further provided with a wheel cavity or well 17, opening downwardly at the bottom wall 11, adjacent each side wall 12. The wells or cavities 17, occurring at the opposite sides of the section 10 are arranged intermediate the front and rear ends of the section.

A suitable axle (not shown) is secured to the frame of the section 10 adjacent the bottom 11 and intermediate the ends of the section. The axle extends transversely of the section 10 and rotatably carries supporting wheels W at each end. The upper portions of the wheels W occur in the wells 17, as clearly illustrated in the drawings.

The trailer T further includes a secondary, box-like inner section 20 having a flat horizontally disposed floor or bottom wall 21, vertically disposed side walls 22, a vertically disposed front end wall 23 and a crowned or cambered roof or top wall 24.

The inner section 20 is provided with a suitable framework, which framework, in addition to other members and/or parts, includes a stringer 25 extending longitudinally along the lower side edge portions of the bottom wall or floor 21 to occur adjacent the inner side of the stringers 15 related thereto. The stringers 25 are provided with a pair of vertically spaced laterally outwardly projecting longitudinal rails 26, which rails cooperate to define longitudinal grooves 27 on the sides of the stringers and in which the rails 16 on the stringers 15 are slideably engaged.

The outside lateral and vertical extent of the secondary inner section 20 is slightly less than the inside lateral and vertical extent of the primary or outer section 10. With this reltionship of parts, it will be apparent that the inner section can be engaged and shifted axially in the outer section, from the open forward end thereof.

The inner section corresponds in longitudinal extent with the distance from the forward portions of the wells 17 to the forward end of the primary or outer section 10. With this relationship of parts, the secondary, inner section can be shifted rearwardly relative to the primary section to a position where it occurs wholly within the outer section, as clearly illustrated in FIGURE 1 of the drawings. When the sections are thus arranged, in their collapsed position, the trailer is a minimum overall longitudinal extent, is more maneuverable, as a minimum of overhang and is therefore less subject to becoming hung up when trailed over rough ground and the like, and is so balanced as to distribute a predetermined, desired portion of its weight on the towing vehicle with which it is related.

Figure 2:
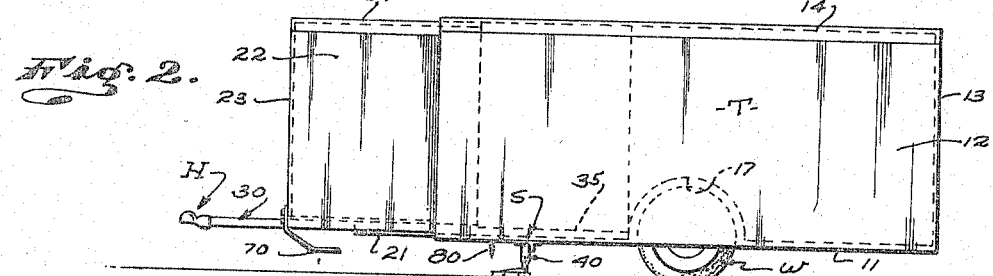
FIGURE 2 is a view of the trailer and support means illustrated in FIGURE 1 and showing the trailer in its extended position and disconnected from the towing vehicle and showing the supporting means in its down or working position.

When it is desired to occupy and use the trailer, the secondary inner section 20 can be shifted longitudinally forward relative to the primary outer section 10, to its extended position, as illustrated in FIGURE 2 of the drawings. When thus extended, the effective and usable space defined by the trailer is materially increased.

When fully extended, a predetermined extent of the rear portion of the secondary inner section remains engaged in the forward portion of the primary, outer section, as illustrated in FIGURE 2 of the drawings, and so that a complete separation of the sections will not occur and so that sufficient bearing engagement can be provided between the several rails and the tongue construction, as will hereinafter be described, to prevent misalignment and/or buckling of the sections relative to each other.

It will be apparent that the several rails 16 and 26 on the stringers 15 and 25 serve to slidably support the section 20 within the section 10 and maintain the sections in alignment at all times.

In practice, if necessary or desired, rails similar to the rails 16 and 26 can be provided between the adjacent side walls 12 and 22 and/or between the top walls 14 and 24, as desired, or as circumstances require.

In addition to the foregoing, the secondary, inner section 20 is provided with a central longitudinally extending tongue 30 fixed to the underside of the bottom wall 21. The tongue 30 is coextensive with the inner section and projects forwardly therefrom a predetermined distance.

A portion of a suitable trailer hitch, H, is fixed to the forward end of the tongue to releasably engage the remaining portion of the hitch which is fixed to the rear end of the towing vehicle, in accordance with normal practice.

The tongue 30 is an elongate steel section having a top wall 31, side walls 32 and laterally inwardly projecting flanges 33 along the lower edges of the side walls. The tongue is open at its rear end and the flanges 33 define a longitudinal, downwardly opening slot, coextensive with the tongue.

The tongue further includes a secondary, reinforcing tongue or core 35 slidably engaged in the tongue 30. The core 35 is an elongate member fixed to the upper side of the bottom wall 11 of the primary section 10. The core 35 is arranged centrally of the section 10 to extend longitudinally thereof, is coextensive with that portion of the section 10 occurring forward of the wells 17 and projects forwardly therefrom to terminate at the forward portion of the tongue adjacent the hitch H, when the construction is in its collapsed position, as illustrated in FIGURE 1 of the drawings.

When the trailer construction is in its extended position, the forward portion of the core 35 extends throughout the major longitudinal extent of the inner section and imparts great rigidity and resistance to bending moments of force between the inner and outer sections.

The core 35 is shown as having a body portion 36 which is slidably engaged within the tongue 30 and has a downwardly projecting, longitudinal rail-like flange 37 that projects between the flanges 33 of the tongue and is fixed to the bottom wall 11 of the section 10.

In practice, suitable lock and/or stop means (not shown) are provided between the sections 10 and 20 to stop and releasably secure the sections in one or the other of their two positions.

Further, in practice, the sections 10 and 20 of the trailer T can, themselves, be sectional and such that the trailer can be extended and/or collapsed vertically and/or laterally, without departing from the spirit of this invention.

A trailer construction similar to that described above, which is also adjustable or extensible in other dimensions is disclosed in my prior Patent No. 2,756,094, issued July 24, 1956.

The support means S that I provide includes a pair of like standards 40 fixed to the lower side of the bottom wall 11 of the outer or primary section 10, forward of the wheels W. The standards 40 are arranged at the opposite sides of the trailer.

Each standard 40 is shown as including a mounting bracket or pad 41 fixed to the section 10 of the trailer by means of suitable screw fasteners 42 and having a downwardly projecting or depending aperture plate 43 which plate occurs in a plane parallel with the longitudinal axis of the trailer. The plate 43 is provided with an enlargement 44 at its rear portion defining forwardly and downwardly disposed stop shoulders 45 at the opposite sides of the plate.

Each standard further includes an elongate sectional column with an upper tube section 46 having upper and lower ends, a plurality of laterally opening, longitudinally spaced pin-receiving openings 47 and a yoke-type coupling block 48 secured to its upper end. The yoke block 48 has a pair of laterally spaced upwardly projecting apertured arms 49, which arms slidably engage the opposite sides of the plate 43.

A suitable pivot pin 50 is engaged through the apertures in the plate and the arms of the block to pivotally secure the block 48 and the tube sections 46 to the plate of the mounting brackets.

Figures 3, 4, 5:
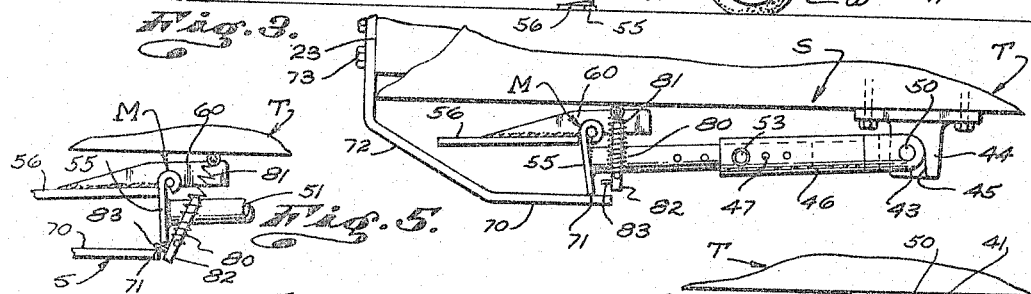
FIGURE 3 is an enlarged view of the support means, showing it in its retracted position.
FIGURE 4 is a view of a portion of the construction illustrated in FIGURE 3 and showing it in down or working position.
FIGURE 5 is a view similar to a portion of the construction illustrated in FIGURE 3 and showing it in a different position.
Figures 6, 7:
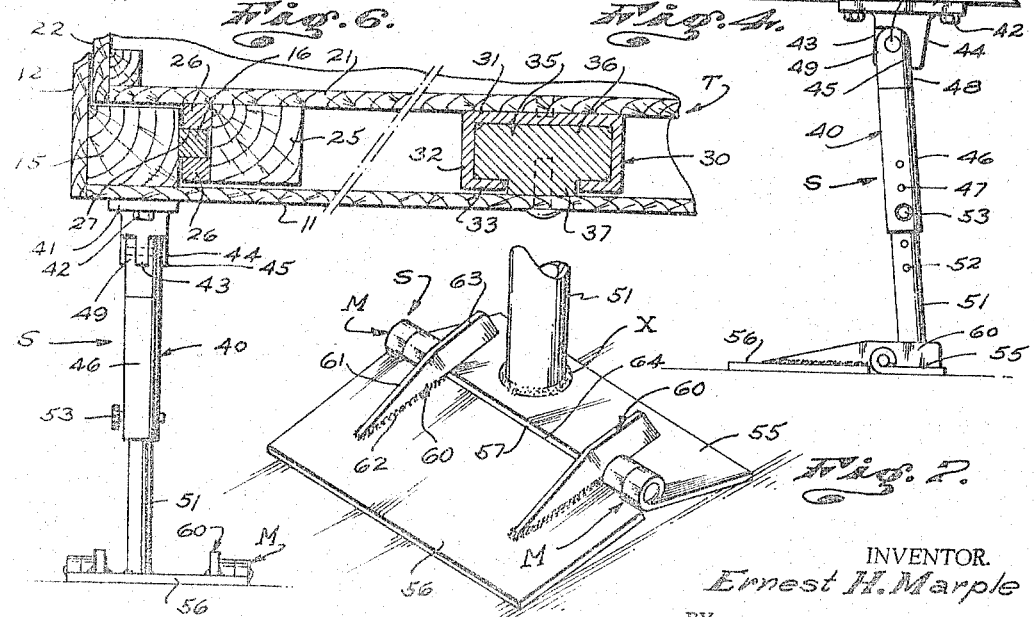
FIGURE 6 is a view taken as indicated on line 6—6 on FIGURE 4.
FIGURE 7 is an isometric view of the pad portion of my new support means.

The block 48 and the tube 46 are shiftable, pivotally, from a substantially horizontal, up or retracted position, as illustrated in FIGURES 1 and 3 of the drawings, to a substantially vertical, down or working position, as illustrated in FIGURES 2, 4 and 6 of the drawings.

When the standards are in their down or working position, the tubes 46 shift or swing over center to a position where they are inclined forwardly and upwardly to a limited extent, say, for example, five degrees, and to a position where the blocks 48 engage and stop against the shoulders 45, as clearly illustrated in FIGURE 4 of the drawings.

The sectional column of each standard further includes a lower, elongate tube section 51 slidably engaged in the upper section 46, from the lower end thereof. The section 51 is provided with a plurality of longitudinally spaced laterally opening pin-receiving openings 52, to register with the openings 47 in the upper section 46.

A suitable lock pin 53 is engaged in and through a pair of the registering openings 47 and 52. With this relationship of parts, it will be apparent that the longitudinal extent of the columns can be adjusted and varied as circumstances require.

The lower end of each lower tube section 51 is provided with a flat rectangular ground-engaging plate 55. The plate 55 is fixed to the lower end of the tube section 51 as by welding X and is arranged on a plane which is about five degrees from normal to the longitudinal axis of the column so that when the column is in its down position the plate 55 is on a horizontal plane, as clearly illustrated in FIGURE 4 of the drawings.

The plate 55 is of considerable lateral extent and of minimum longitudinal extent with respect to the longitudinal axis of the trailer and so that when the column is in its up or retracted position, the plate 55 is of minimum vertical extent and does not present an obstacle or obstruction below the trailer and so that when the standard is shifted from its up position to its down working position, the rear or trailing edge of the plate, which initially engages the ground, does not lead the column to such an extent as will unduly impede shifting the column overcenter or result in a camming action of such magnitude as will make operation of the means S difficult or impossible.

In practice, and as illustrated, the plate 55 is secured to the lower section 51 of the column so that it does not project laterally outwardly from below the trailer and present an obstruction at the side of the trailer, but projects laterally inwardly from the section 51 of the column to that extent which is necessary to provide it with the necessary or desired effective ground-engaging area.

In addition to the foregoing, the pad 55 is provided with a leaf-like extension 56 which extension is a simple flat rectangular plate pivotally secured to the forward edge 57 of the pad 55 by suitable hinge means M.

In the case illustrated, the hinge means M is shown as being established integrally with the pad and leaf extension and as being such as will allow the leaf extension to pivot substantially 90 degrees from a position where the extension projects horizontally forwardly from the pad, when the construction is in its up position, to horizontal position where it projects forwardly and in a common plane with the pad, when the construction is in its working position, as illustrated in FIGURES 3 and 4 of the drawings.

It is to be understood that the hinge means M can be in the form of a simple butt hinge fixed to the pad and the extension by welding or the like.

The extension 56 is further provided with a plurality (two) of laterally spaced stops 60. The stops 60 involve elongate plate-like members having forward portions 61 extending longitudinally of the extension 56 and fixed to the top surface thereof as by welding 62, and rear portions 63 projecting rearwardly or beyond the rear edge 64 of the extension and adapted to overlie and establish bearing engagement on the top of the pad 55 when the construction is in its down or working position, as illustrated in FIGURE 4 of the drawings. The stops 60 in addition to reinforcing the extension and backing and reinforcing the pad, also prevent excessive pivotal movement between the extension and the pad when the construction is in working position.

It is to be noted that when the construction is in its up or retracted position, the rear portions of the stops project rearwardly fromt he extension, not upwardly, and in such a manner as would prevent shifting of the column into a horizontal position and into close proximity with the bottom of the trailer.

The means further includes a support 70 for each standard at the forward end of the inner, forward or secondary section of the trailer T.

The support 70 for each standard consists of an elongate longitudinally extending, horizontally disposed bar arranged below the forward portion of the section 20 of the trailer, in axial alignment with the standard related thereto and so that when the trailer is in its trailable or collapsed position, as illustrated in FIGURES 1 and 3 of the drawings, the bar projects rearwardly below the forward portion of the primary section 10 and engages and supports the rear (downwardly disposed) edge 70 of the support pad 55.

In the case illustrated, the forward end of the support bar 70 is provided with a forwardly and then upwardly projecting extension 72, the forward and upper end of which occurs adjacent and is fixed to the front wall 23 of the section 20 by means of suitable screw fasteners 73.

With the support 70 set forth above, it will be apparent that the standards are normally held up in their retracted or up position by the supports 70 and that when the section 20 of the trailer is shifted forwardly relative to the section 10, as by means of the towing vehicle, the supports 70 are shifted or drawn from engagement below the standards and the standards are free to swing down and into initial engagement with the ground.

When the section 20 is fully extended and the trailer is towed a very slight distance forward, the standards are shifted overcenter and to their working position.

With the supports 70 that I provide it is unnecessary for the operator of my construction to release or otherwise manipulate the standards when it is desired to set up and support the trailer for occupancy or use.

The means S is further provided with a suitable spring latch 80. The latch 80 is adapted to releasably hold the standard to which it is related, up in its retracted position when the trailer is shifted from its extended position to its retracted position and where the supports 70 engage and hold the standards.

The latches 80 include elongate vertically disposed helical tension springs 81, the upper ends of which are fixed to the lower side of the section 10 of the trailer at points above the forward lower end portions of the standards, when the standards are in their up positions. The springs have their lower ends fixed to elongate rods 82, which rods have upper portions extending through the spring and lower portions depending from the lower end of the springs. The lower portions of the rods are provided with laterally forwardly projecting pins 83, which pins engage or hook below the downwardly disposed rear edges 71 of the standard pads 55 when the standards are in their up position.

In operation, when it is desired to collapse the trailer and shift the standards to their up position, the trailer is hitched to the towing vehicle, with the sections 10 and 20 thereof in locked extended position. The trailer is then shifted rearwardly a short distance by means of the towing vehicle. This rearward shifting of the trailer causes the standards to pivot forwardly and upwardly over center and to a position where they can be conveniently manually shifted or elevated to their up position. The standards are thus shifted to the up position and the latches 80 are engaged therewith to releasably hold the standards up. The sections 10 and 20 of the trailer are then unlocked and the section 20, by means of the towing vehicle is shifted rearwardly relative to and into the section 20. Before the section 20 is fully engaged in the section 10, the support 70 shifts below the pads 55 of the supports and engage the lower ends of the bars 82 of the latches 80. Upon further rearward shifting of the sections 20, the latches 80 are urged or shifted out of engagement from the standards and the standards are thereby released so as to be supported wholly by the supports 70 and are ready for subsequent release and use.

Having described only a typical preferred form and application of my invention, I do not wish to be limited to the specific details herein set forth but wish to reserve to myself any modifications or variations that may appear to those skilled in the art and which fall within the scope of the following claims.

Having described my invention, I claim:

1. An extensible trailer of the character referred to including, an outer elongate primary box section with bottom, side, rear end and top walls, an inner secondary box section with bottom, side, front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section.

2. An extensible trailer of the character referred to including, an outer elongate primary box section with bottom, side, rear end and top walls, an inner secondary box section with bottom, side, front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column.

3. A structure as set forth in claim 2 wherein said mounting bracket has rearwardly and downwardly disposed stop shoulders to engage and stop the column when the column is shifted to its working position, whereby said column is moved overcenter when shifted into and out of working position.

4. A structure as set forth in claim 2 wherein said column is sectional and includes an elongate upper tube having one end connected with the mounting bracket and a lower section having one end fixed to the pad and its other end slidably engaged in the upper section, said upper and lower sections having longitudinally spaced pin-receiving openings adapted to be shifted into and out of register with each other upon relative axial shifting of the upper and lower sections and a lock pin engaged in a pair of registering pin-receiving openings.

5. An extensible trailer of the character referred to including, an outer elongate primary box section with bottom, side, rear end and top walls, an inner secondary box section with bottom, side, front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column, including, a spring latch fixed to the primary section to depend therefrom and engageable with the pad.

6. An extensible trailer of the character referred to including, an outer elongate primary box section with bottom, side, rear end and top walls, an inner secondary box section with bottom, side, front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column, including, a spring latch fixed to the primary section to depend therefrom and engageable with the pad including, a horizontally disposed support bar carried by the forward portion of the secondary section to project rearwardly beneath the primary section and to engage beneath and support the pad of the standard when the secondary section is fully engaged within the primary section.

7. An extensible trailer of the character referred to including, an outer elongate primary box section with bottom, side, rear end and top walls, an inner secondary box section with bottom, side, front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column including, a spring latch fixed to the primary section to depend therefrom and releasably engage the pad on the standard when the secondary section is shifted forwardly relative to the primary section, a horizontally disposed support bar carried by the forward portion of the secondary section to project rearwardly beneath the primary section and to engage beneath and support the pad of the standard and to engage and release the spring latch when the secondary section is shifted rearwardly and into full engagement into the primary section.

8. An extensible trailer of the character referred to including, an outer elongate primary box section with bottom, side, rear end and top walls, an inner secondary box section with bottom, side, front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column, said ground-engaging pad having a flat leaf extension pivotally secured thereto to project forwardly therefrom in a horizontal plane when said standard is in either its up or its working position.

9. An extensible trailer of the character referred to including, an outer elongate primary box section with bottom, side, rear end and top walls, an inner secondary box section with bottom, side front end and top walls and telescopically engaged in the front end portion of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column, said ground-engaging pad having a flat leaf extension pivotally secured thereto to project forwardly therefrom in a horizontal plane when said standard is in either its up or its working position, said extension having a flat top surface with reinforcing ribs fixed thereto, said ribs having portions projecting from the extension to overlie and establish stop bearing engagement on the pad when the standard is in its working position and the pad and extension occur in a common plane.

13. An extensible trailer of the character referred to including, an outer elongate primary box section with bottom, side, rear end and top walls, an inner secondary box section with bottom, side, front end and top walls and telescopically engaged in the front end portions of the primary section, guide means between the sections to support the secondary section within the primary section for free longitudinal shifting relative thereto, said primary section having supporting wheels at its opposite sides and intermediate its ends, said secondary section having an elongate tubular tongue with a rear portion fixed to the lower surface of the bottom wall and intermediate the sides of the secondary section and coextensive with the longitudinal extent thereof and a forward portion projecting longitudinally forwardly from the secondary section and carrying a portion of a trailer hitch at its forward terminal end, said tongue opening rearwardly and having a downwardly opening longitudinal slot coextensive therewith, an elongate core slidably engaged in the tongue and coextensive therewith when the secondary section is fully engaged within the primary section, said core having a downwardly projecting longitudinal mounting rib projecting through the slot in the tongue, the rear portion of said rib being fixed to the upper surface of the bottom wall of the primary section, and support means to hold the forward portion of the trailer up when it is not connected with a towing vehicle and when said secondary section is shifted forwardly and out of full engagement in the primary section, said support means including like standards fixed to the bottom wall of the primary section at the opposite sides thereof and forward of the wheels, each standard including a mounting bracket secured to the bottom wall of the primary section, an elongate column pivotally connected with the bracket on an axis extending transverse the longitudinal axis of the trailer whereby the column can be shifted from an up, forwardly extending horizontal position, to a down, vertically extending, working position, a flat ground-engaging pad fixed to the end of the column remote from the mounting bracket and on a plane substantially normal to the longitudinal axis of the column including, a spring latch fixed to the primary section to depend therefrom and releasably engage the pad on the standard when the secondary section is shifted forwardly relative to the primary section, a horizontally disposed support bar carried by the forward portion of the secondary section to project rearwardly beneath the primary section and to engage beneath and support the pad of the standard and to engage and release the spring latch when the secondary section is shifted rearwardly and into full engagement into the primary section, said ground-engaging pad having a flat leaf extension pivotally secured thereto to project forwardly therefrom in a horizontal plane when said standard is in either its up or its working position, said extension having a flat top surface with reinforcing ribs fixed thereto, said ribs having portions projecting from the extension to overlie and establish bearing stopped engagement on the top surface of the pad when the standard is in its working position and the pad and extension occur in a common plane.

References Cited by the Examiner

UNITED STATES PATENTS

| | | | |
|---|---|---|---|
| 416,519 | 12/1889 | Troxell | 280—150.5 X |
| 467,423 | 1/1892 | Merritt | 296—26 |
| 2,665,938 | 1/1954 | McCrossen | 280—150.5 X |
| 2,865,658 | 12/1958 | Dubuque | 280—150.5 X |
| 3,116,085 | 12/1963 | Uttley | 296—26 |

MILTON BUCHLER, *Primary Examiner.*

BENJAMIN HERSH, *Examiner.*

M. S. SALES, L. D. MORRIS, *Assistant Examiners.*